United States Patent
Itai et al.

(10) Patent No.: US 7,173,072 B2
(45) Date of Patent: Feb. 6, 2007

(54) RADIATION-CURABLE RESIN COMPOSITION FOR FORMING OPTICAL PART AND OPTICAL PART

(75) Inventors: Shingo Itai, Tokyo (JP); Satoshi Futami, Tokyo (JP); Yoshikazu Yamaguchi, Tokyo (JP); Takayoshi Tanabe, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/840,416

(22) Filed: May 7, 2004

(65) Prior Publication Data

US 2005/0032927 A1 Feb. 10, 2005

(30) Foreign Application Priority Data

May 8, 2003 (JP) .............................. 2003-130031

(51) Int. Cl.
*C08F 2/46* (2006.01)
(52) U.S. Cl. ..................... 522/96; 522/182; 522/90; 522/178
(58) Field of Classification Search ................ 522/96, 522/182, 178, 90
See application file for complete search history.

(56) References Cited

U.S. PATENT DOCUMENTS

| 4,985,472 | A | * | 1/1991 | Aosai et al. ................. 522/64 |
| 5,787,218 | A | | 7/1998 | Ohtaka et al. |
| 5,903,399 | A | | 5/1999 | Yamashita et al. |
| 2003/0021943 | A1 | | 1/2003 | Takase |

FOREIGN PATENT DOCUMENTS

| JP | 09241336 | 9/1997 |
| WO | 96/11965 | 4/1996 |
| WO | 97/00276 | 1/1997 |

OTHER PUBLICATIONS

Patent Abstracts of Japan, vol. 1998, No. 01, English Abstract of JP 09241336; Sep. 16, 1997.
Derwent Publications Ltd., AN-1992-044401, English Abstract of JP 03287641.

* cited by examiner

*Primary Examiner*—Sanza L. McClendon
(74) *Attorney, Agent, or Firm*—Mayer Brown Rowe & Maw LLP

(57) ABSTRACT

To provide a UV-curable resin composition useful for forming optical parts such as optical lenses. A radiation-curable resin composition for optical parts, comprising (A) 5–70 wt % of urethane (meth)acrylate, (B) 0.1–70 wt % of benzyl (meth)acrylate, and (C) 10–70 wt % of an ethylenically unsaturated group-containing compound other than the components (A) and (B).

1 Claim, No Drawings

RADIATION-CURABLE RESIN COMPOSITION FOR FORMING OPTICAL PART AND OPTICAL PART

FIELD OF THE INVENTION

The present invention relates to a radiation-curable resin composition. More particularly, the present invention relates to a radiation-curable resin composition useful for forming optical parts such as lenses of a prism lens sheet used as a backlight for a liquid crystal display or a Fresnel lens sheet and a lenticular lens sheet used as a screen for a projection TV, or a backlight using such a sheet, and to an optical part formed of a cured product of the composition.

PRIOR ART

Conventionally, lenses such as a Fresnel lens and a lenticular lens are manufactured by using a press-forming process or a casting process. However, these processes require a long period of time for manufacturing the lens, thereby resulting in poor productivity. In order to solve this problem, a method of manufacturing a lens by using a UV-curable resin has been studied in recent years. In more detail, a UV-curable resin composition is poured between a mold having a lens shape and a transparent resin substrate, and the composition is cured by applying ultraviolet rays from the side of the substrate, whereby a lens can be manufactured in a short period of time. In recent years, a decrease in thickness and an increase in size of projection TVs and video projectors have progressed. Therefore, various proposals and examinations have been made on resins for forming lenses in order to deal with a demand for various lens properties such as an increase in refractive index and mechanical properties. For example, UV-curable resin compositions including a urethane (meth)acrylate, a monomer containing an ethylenically unsaturated group, and a photoinitiator have been proposed (see patent documents 1, 2, and 3).

Patent Document 1
  Japanese Patent Application Laid-open No. 4-288314
Patent Document 2
  Japanese Patent Application Laid-open No. 5-255464
Patent Document 3
  Japanese Patent Application Laid-open No. 2001-200022

Problems to Be Solved by the Invention

However, such conventional UV-curable resin compositions cannot produce a cured product which satisfies properties required for lenses such as a high refractive index, adhesion to various plastic substrates, in particular, adhesion in a wet-heat environment, and releasability from the mold.

Means for Solving the Problems

The present inventors have conducted extensive studies to solve the problems of conventional resin compositions. As a result, the present inventors have found that an optical part, in particular, a transparent screen such as a Fresnel lens or a lenticular lens having a high refractive index and exhibiting excellent adhesion to various plastic substrates in a wet-heat environment can be obtained by producing a cured product using a radiation-curable resin composition comprising (A) a urethane (meth)acrylate, (B) benzyl (meth)acrylate, and (C) a compound containing an ethylenically unsaturated group other than the components (A) and (B) in specific amounts. This finding has led to the completion of the present invention.

Specifically, the present invention provides a radiation-curable resin composition for an optical part, comprising (A) 5–70 wt % of urethane (meth)acrylate, (B) 0.1–70 wt % of benzyl (meth)acrylate, and (C) 10–70 wt % of an ethylenically unsaturated group containing compound other than the components (A) and (B).

The present invention also provides an optical part formed of a cured product of the radiation-curable resin composition, in particular, an optical lens.

Preferred Embodiment of the Invention

The radiation-curable resin composition of the present invention comprises benzyl (meth)acrylate.

The component (A) of the present invention is a urethane (meth)acrylate. The urethane (meth)acrylate (B) is obtained by reacting (a) a hydroxyl-group-containing (meth)acrylate, (b) an organic polyisocyanate, and (c) a polyol, for example.

As examples of the hydroxyl group-containing (meth)acrylate, 2-hydroxyethyl(meth)acrylate, 2-hydroxypropyl (meth)acrylate, 2-hydroxybutyl(meth)acrylate, 2-hydroxy-3-phenyloxypropyl(meth)acrylate, 1,4-butanediol mono (meth)acrylate, 2-hydroxyalkyl(meth)acryloyl phosphate, 4-hydroxycyclohexyl(meth)acrylate, 1,6-hexanediol mono (meth)acrylate, neopentyl glycol mono(meth)acrylate, trimethylolpropane di(meth)acrylate, trimethylolethane di(meth) acrylate, pentaerythritol tri(meth)acrylate, dipentaerythritol penta(meth)acrylate, and (meth)acrylate shown by the following formula (1) can be given.

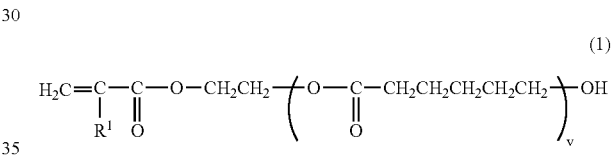

(1)

wherein $R^1$ represents a hydrogen atom or a methyl group, and v is an integer of 1–15. A compound obtained by an addition reaction of (meth)acrylic acid and a glycidyl group-containing compound such as alkyl glycidyl ether, allyl glycidyl ether, and glycidyl (meth)acrylate may be used. The hydroxyl group-containing (meth)acrylate may be used either individually or in combination of two or more.

As examples of the organic polyisocyanate (b), 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, and the like can be given. Of these, 2,4-tolylene diisocyanate, 2,6-tolylene diisocyanate, 1,3-xylylene diisocyanate, or 1,4-xylylene diisocyanate is preferably used.

As examples of the polyol (c), ethylene glycol, propylene glycol, 1,4-butanediol, neopentyl glycol, 3-methyl-1,5-pentanediol, 1,3-butanediol, cyclohexanedimethylol, tricyclodecanedimethylol, 1,6-hexanediol, 2-butyl-2-ethyl-propanediol, bisphenol A polyethoxy glycol, bisphenol A polypropoxy glycol, bisphenol A polyethoxypropoxy glycol, bisphenol F polyethoxy glycol, bisphenol F polypropoxy glycol, bisphenol F polyethoxypropoxy glycol, bisphenol S polyethoxy glycol, bisphenol S polypropoxy glycol, bisphenol S polyethoxypropoxy glycol, polytetramethylene glycol, polypropylene glycol, polybutylene glycol, polyethylene butylene glycol, polycaprolactonediol, polyesterdiol, polycarbonatediol, and the like can be given.

It is preferable to use at least one compound selected from the group consisting of bisphenol A polyethoxy glycol (average degree of polymerization n is preferably 2–40), bisphenol A polypropoxy glycol (average degree of polymerization n is preferably 2–40), bisphenol A polyethoxypropoxy glycol (average degree of polymerization n is preferably 2–40), bisphenol F polyethoxy glycol (average degree of polymerization n is preferably 2–40), bisphenol F polypropoxy glycol (average degree of polymerization n is preferably 2–40), bisphenol F polyethoxypropoxy glycol (average degree of polymerization n is preferably 2–40), bisphenol S polyethoxy glycol (average degree of polymerization n is preferably 2–40), bisphenol S polypropoxy glycolglycol (average degree of polymerization n is preferably 2–40), and bisphenol S polyethoxypropoxy glycol (average degree of polymerization n is preferably 2–40) from the viewpoint of the refractive index.

As a method for producing the urethane (meth)acrylate used as the component (A), a method of reacting the polyol with the organic polyisocyanate, and reacting the resulting product with the hydroxyl group-containing (meth)acrylate; a method of reacting the organic polyisocyanate with the hydroxyl group-containing (meth)acrylate, and reacting the resulting product with the polyol; and a method of reacting the polyol, the organic polyisocyanate, and the hydroxyl group-containing (meth)acrylate all together; can be given. Of these, the method of reacting the organic diisocyanate with the hydroxyl group-containing (meth)acrylate, and reacting the resulting product with the polyol is preferable in order to obtain the urethane (meth)acrylate of the present invention.

In the production of the urethane (meth)acrylate used as the component (A), the hydroxyl group-containing (meth)acrylate, the organic polyisocyanate, and the polyol are preferably used in such an amount that the isocyanate group in the organic polyisocyanate and the hydroxyl group in the hydroxyl group-containing (meth)acrylate are respectively 1.1–2 equivalents and 0.1–1 equivalent for one equivalent of the hydroxyl group in the polyol. The hydroxyl group-containing (meth)acrylate, the organic polyisocyanate, and the polyol are particularly preferably used in such an amount that the isocyanate group in the organic polyisocyanate and the hydroxyl group in the hydroxyl group-containing (meth)acrylate are respectively 1.3–2 equivalents and 0.3–1 equivalent for one equivalent of the hydroxyl group in the polyol. If the amount is outside the preferable range, it becomes difficult to handle the composition in a liquid state due to an increase in viscosity or the like.

In the production of the urethane (meth)acrylate used as the component (A), a urethanization catalyst such as copper naphthenate, cobalt naphthenate, zinc naphthenate, di-n-butyltin dilaurate, triethylamine, and triethylenediamine-2-methyltriethyleneamine is usually used in an amount of 0.01–1 wt % of the total amount of the reactants. The reaction temperature is preferably 10–90° C., and particularly preferably 30–80° C.

The number average molecular weight of the urethane (meth)acrylate (A) is preferably 500–20,000, and particularly preferably 1,000 to 15,000. If the number average molecular weight of the urethane (meth)acrylate used as the component (A) is less than 500, adhesion to a base material of a cured product obtained by curing the resin composition decreases. If the number average molecular weight exceeds 20,000, handling of the resin composition may become difficult due to an increase in viscosity.

The urethane (meth)acrylate used as the component (A) is added to the resin composition in an amount of preferably 5–70 wt %, and particularly preferably 10–60 wt %. It is preferable that the lower limit be within the above range for providing moderate mechanical characteristics such as toughness to the cured product. It is preferable that the upper limit be within the above range for preventing a decrease in workability and applicability caused by an increase in viscosity of the composition.

The component (B) used in the radiation-curable resin composition of the present invention is benzyl (meth)acrylate. The benzyl (meth)acrylate is added to the resin composition in an amount of usually 0.1–70 wt %, preferably 0.5–50 wt %, and still more preferably 1–20 wt %. It is preferable that the lower limit be within the above range for providing the cured product with heat-moisture adhesion to a substrate. It is preferable that the upper limit be within the above range for preventing a decrease in workability and applicability due to a decrease in viscosity of the composition.

The component (C) used in the radiation-curable resin composition of the present invention is an ethylenically unsaturated group-containing compound other than the components (A) and (B). A compound containing a (meth)acryloyl group or a vinyl group (hereinafter called "unsaturated monomer") may be used as the component (C). As the unsaturated monomer, a monofunctional monomer and a polyfunctional monomer may be used.

As examples of the monofunctional monomers, vinyl monomers such as N-vinylpyrrolidone, N-vinylcaprolactam, vinylimidazole, and vinylpyridine; phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, (meth)acrylate of p-cumylphenol reacted with ethylene oxide, 2-bromophenoxyethyl (meth)acrylate, 2,4-dibromophenoxyethyl (meth)acrylate, 2,4,6-tribromophenoxyethyl (meth)acrylate, phenoxy (meth)acrylate modified with two mol or more of ethylene oxide or propylene oxide, isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether, and compounds shown by the following formulas (2) and (3) can be given.

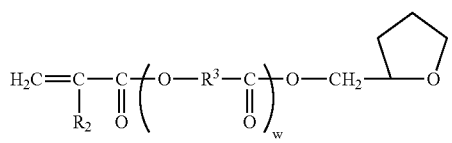
(2)

wherein $R^2$ represents a hydrogen atom or a methyl group, $R^3$ represents an alkylene group having 2–8 carbon atoms, and w represents a number of 1–8.

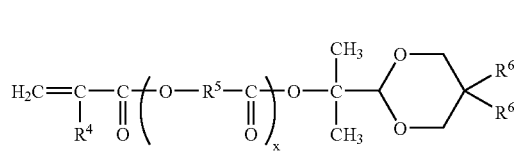
(3)

wherein $R^4$ and $R^6$ individually represent a hydrogen atom or a methyl group, $R^5$ represents an alkylene group having 2–8 carbon atoms, and x represents a number of 1–8.

As examples of the polyfunctional monomers, trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl) isocyanurate tri(meth)acrylate, tris(acryloyloxy) isocyanurate, bis(hydroxymethyl)tricyclodecane di(meth) acrylate, dipentaerythritol hexa(meth)acrylate, di(meth) acrylate of polyethylene oxide or propylene oxide addition diol of bisphenol A, di(meth)acrylate of ethylene oxide or propylene oxide addition diol of hydrogenated bisphenol A, epoxy(meth)acrylate obtained by addition of (meth)acrylate to diglycidyl ether of bisphenol A, triethylene glycol divinyl ether, and the like can be given.

As examples of commercially available products of the monofunctional monomers, Aronix M101, M102, M110, M111, M113, M117, M5700, TO-1317, M120, M150, M156 (manufactured by Toagosei Co., Ltd.), LA, IBXA, 2-MTA, HPA, Viscoat #150, #155, #158, #190, #192, #193, #220, #2000, #2100, #2150 (manufactured by Osaka Organic Chemical Industry Co., Ltd.), Light Acrylate BO-A, EC-A, DMP-A, THF-A, HOP-A, HOA-MPE, HOA-MPL, PO-A, P-200A, NP-4EA, NP-8EA, Epoxy Ester M-600A (manufactured by Kyoeisha Chemical Co., Ltd.), KAYARAD TC110S, R-564, R-128H (manufactured by Nippon Kayaku Co., Ltd.), NK Ester AMP-10G, AMP-20G (manufactured by Shin-Nakamura Chemical Co., Ltd.), FA-511A, 512A, 513A (manufactured by Hitachi Chemical Co., Ltd.), PHE, CEA, PHE-2, PHE-4, BR-31, BR-31M, BR-32 (manufactured by Daiichi Kogyo Seiyaku Co., Ltd.), VP (manufactured by BASF), ACMO, DMM, DMAPM (manufactured by KOHJIN Co., Ltd.), and the like can be given.

As examples of commercially available products of the polyfunctional monomers, Yupimer UV SA1002, SA2007 (manufactured by Mitsubishi Chemical Corp.), Viscoat #195, #230, #215, #260, #335HP, #295, #300, #360, #700, GPT, 3PA (manufactured by Osaka Organic Chemical Industry Co., Ltd.), Light Acrylate 4EG-A, 9EG-A, NP-A, DCP-A, BP-4EA, BP4PA, TMP-A, PE-3A, PE4A, DPE-6A (manufactured by Kyoeisha Chemical Co., Ltd.), KAYARAD PET-30, TMPTA, R-604, DPHA, DPCA-20,-30,-60,-120, HX-620, D-310, D-330 (manufactured by Nippon Kayaku Co., Ltd.), Aronix M-208, M-210, M-215, M-220, M-240, M-305, M-309, M-310, M-315, M-325, M400 (manufactured by Toagosei Co., Ltd.), Ripoxy VR-77, VR-60, VR-90 (manufactured by Showa Highpolymer Co., Ltd.), and the like can be given.

The component (C) is added to the composition in an amount of preferably 10–70 wt %, and particularly preferably 20–60 wt %. It is preferable that the lower limit be within the above range from the viewpoint of viscosity of the composition and the refractive index of the cured product. It is preferable that the upper limit be within the above range for ensuring sufficient mechanical properties and applicability.

The radiation-curable resin composition of the present invention is cured by applying radiation. Radiation used herein includes infrared radiation, visible radiation, ultraviolet radiation, ionizing radiation such as X-rays, electron beams, α-rays, β-rays, and γ-rays. Light such as ultraviolet radiation is conveniently used. A photoinitiator used as the component (D) is necessary for the photocuring reaction. A photosensitizer may be added, if necessary. The photoinitiator may be a compound which decomposes upon irradiation and generates radicals to initiate polymerization. As examples of the photoinitiator, acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide, and the like can be given.

As examples of commercially available products of the photoinitiator (D), Irgacure 184, 369, 651, 500, 819, 907, 784, 2959, CGI-1700, CGI-1750, CGI-1850, CG24–61, Darocur 1116, 1173 (manufactured by Ciba Specialty Chemicals Co., Ltd.), Lucirin TPO, LR8893, LR8970 (manufactured by BASF), Ubecryl P36 (manufactured by UCB), and the like can be given.

As examples of the photosensitizer, triethylamine, diethylamine, N-methyldiethanolamine, ethanolamine, 4-dimethylaminobenzoic acid, methyl 4-dimethylaminobenzoate, ethyl 4-dimethylaminobenzoate, isoamyl 4-dimethylaminobenzoate, and the like can be given. As examples of commercially available products of the photosensitizer, Ubecryl P102, 103, 104, 105 (manufactured by UCB), and the like can be given.

The optimum amount of the photoinitiator (D) used to cure the resin composition of the present invention is 0.01–10 wt %, and preferably 0.5–7 wt % of the total amount of the composition. The above upper limit is preferable from the viewpoint of curing characteristics of the composition, and mechanical and optical characteristics and handling of the cured product. The lower limit is preferable in order to prevent a decrease in curing speed.

A heat-polymerization initiator may optionally be added when curing the resin composition of the present invention. As examples of preferable heat-polymerization initiators, peroxides and azo compounds can be given. As specific examples of the heat-polymerization initiators, benzoyl peroxide, t-butyl peroxybenzoate, azobisisobutyronitrile, and the like can be given.

Curable oligomers and polymers other than the above components may optionally be added to the resin composition of the present invention insofar as the characteristics of the resin composition are not adversely affected. As examples of such curable oligomers and polymers, polyurethane (meth)acrylate other than the component (A), polyester (meth)acrylate, epoxy (meth)acrylate, polyamide (meth)acrylate, siloxane polymers having a (meth)acryloyloxy group, and reactive polymers produced by reacting a copolymer of glycidyl methacrylate and other polymerizable monomers with (meth)acrylic acid can be given.

In addition to the above components, additives such as antioxidants, UV absorbers, light stabilizers, silane coupling agents, coating surface improvers, heat-polymerization inhibitors, leveling agents, surfactants, coloring agents, preservatives, plasticizers, lubricants, release agents, solvents, fillers, aging preventives, wettability improvers, and the like may be added, as required. As examples of antioxidants, Irganox 1010, 1035, 1076, 1222 (manufactured by Ciba Specialty Chemicals Co., Ltd.), Antigene P, 3C, FR, GA-80 (manufactured by Sumitomo Chemical Industries Co., Ltd.), and the like can be given. As examples of UV absorbers, Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Shipro Kasei Kaisha, Ltd.), and the like can be given. As examples of light stabilizers, Tinuvin 292, 144, 622LD (manufactured by Ciba Specialty Chemicals Co., Ltd.), Sanol LS770 (manufactured by Sankyo Co., Ltd.), Sumisorb TM-061 (manufactured by Sumitomo Chemical Industries Co., Ltd.), and the like can be given. As examples of silane coupling agents, γ-aminopropyltriethoxysilane, γ-mercaptopropyltrimethoxysilane, and γ-methacryloxypropyltrimethoxysilane, and commercially available products such as SH6062, SH6030 (manufactured by Toray-Dow Corning Silicone Co., Ltd.), KBE903, KBE603, KBE403 (manufactured by Shin-Etsu Chemical Co., Ltd.) can be given. As examples of coating surface improvers, silicone additives such as dimethylsiloxane polyether and commercially available products such as DC-57, DC-190 (manufactured by Dow-Corning), SH-28PA, SH-29PA, SH-30PA, SH-190 (manufactured by Toray-Dow Corning Silicone Co., Ltd.), KF351, KF352, KF353, KF354 (manufactured by Shin-Etsu Chemical Co., Ltd.), L-700, L-7002, L-7500, FK-024-90 (manufactured by Nippon Unicar Co., Ltd.) can be given.

The resin composition of the present invention is produced by mixing the above components using a conventional method. The viscosity of the resin composition of the present invention thus prepared is usually 200–50,000 mPa·s/25° C., and preferably 500–30,000 mPa·s/25° C. If the viscosity of the composition is too great, coating may become uneven or crinkles may occur when forming a lens, or a desired thickness of the lens may not be obtained, whereby performance of the lens may become insufficient. If the viscosity is too low, it is difficult to control the thickness of the lens, whereby a lens having a uniform thickness may not be formed.

The refractive index of the cured product at 25° C. is preferably 1.53 or more, and still more preferably 1.54 or more. If the refractive index is less than 1.53, a translucent screen formed of the resin composition may exhibit insufficient frontal brightness.

The cured product obtained by applying radiation to the resin composition of the present invention is useful as optical parts such as lenses of a prism lens sheet, Fresnel lens sheet, or lenticular lens sheet, or a back light using such a sheet. The cured product is particularly useful as optical lenses. Of these optical lenses, optical lenses manufactured by pouring the radiation-curable resin composition between a mold having a lens shape and a transparent plastic substrate, and curing the composition by applying ultraviolet radiation from the side of the substrate are preferable. Therefore, a preferable optical lens obtained by the present invention is a lens in which the cured product of the present invention adheres to the transparent plastic substrate. As the transparent plastic substrate, a polymethylmethacrylate (PMMA) substrate and a methylmethacrylate-styrene copolymer (MS) substrate can be given. It is preferable use the MS substrate.

EXAMPLES

The present invention is described below in more detail by examples. However, the present invention is not limited to these examples.

Synthesis Example 1 of urethane (meth)acrylate

A reaction vessel equipped with a stirrer was charged with 20.47 wt % of 2,4-tolylene diisocyanate, 0.08 wt % of di-n-butyltin dilaurate, and 0.02 wt % of 2,6-di-t-butyl-p-cresol. 10.45 wt % of 2-hydroxy-3-phenyloxypropyl acrylate was added dropwise with stirring while maintaining the temperature at 30° C. or less. After the addition, the mixture was allowed to react at 30° C. for one hour. After the addition of 68.98 wt % of bisphenol A polypropoxy glycol (average degree of polymerization: n=10), the mixture was allowed to react at 50–70° C. for two hours. The reaction was terminated when the residual isocyanate was reduced to 0.1 wt % or less. The resulting urethane acrylate is referred to as "A-1".

Synthesis Example 2 of urethane (meth)acrylate

A reaction vessel equipped with a stirrer was charged with 20.14 wt % of 2,4-tolylene diisocyanate, 0.08 wt % of di-n-butyltin dilaurate, and 0.02 wt % of 2,6-di-t-butyl-p-cresol. 12.85 wt % of 2-hydroxy-3-phenyloxypropyl acrylate was added dropwise with stirring while maintaining the temperature at 30° C. or less. After the addition, the mixture was allowed to react at 30° C. for one hour. After the addition of 66.90 wt % of bisphenol A polypropoxy glycol (average degree of polymerization: n=10), the mixture was allowed to react at 50–70° C. for two hours. The reaction was terminated when the residual isocyanate was reduced to 0.1 wt % or less. The resulting urethane acrylate is referred to as "A-2".

Synthesis Example 3 of urethane (meth)acrylate

A reaction vessel equipped with a stirrer was charged with 24.14 wt % of 2,4-tolylene diisocyanate, 0.08 wt % of di-n-butyltin dilaurate, and 0.02 wt % of 2,6-di-t-butyl-p-cresol. 30.76 wt % of 2-hydroxy-3-phenyloxypropyl acrylate was added dropwise with stirring while maintaining the temperature at 30° C. or less. After the addition, the mixture was allowed to react at 30° C. for one hour. After the addition of 45.03 wt % of polytetramethylene glycol with an average molecular weight of 650, the mixture was allowed to react at 50–70° C. for two hours. The reaction was terminated when the residual isocyanate was reduced to 0.1 wt % or less. The resulting urethane acrylate is referred to as "A-3".

Synthesis Example 4 of urethane (meth)acrylate

A reaction vessel equipped with a stirrer was charged with 35.22 wt % of 2,4-tolylene diisocyanate, 0.08 wt % of di-n-butyltin dilaurate, and 0.02 wt % of 2,6-di-t-butyl-p-cresol. 23.48 wt % of 2-hydroxyethyl acrylate was added dropwise with stirring while maintaining the temperature at 30° C. or less. After the addition, the mixture was allowed to react at 30° C. for one hour. After the addition of 41.30 wt % of bisphenol A polyethoxy glycol (average degree of polymerization: n=4), the mixture was allowed to react at 50–70° C. for two hours. The reaction was terminated when the residual isocyanate was reduced to 0.1 wt % or less. The resulting urethane acrylate is referred to as "A-4".

Synthesis Example 5 of urethane (meth)acrylate

A reaction vessel equipped with a stirrer was charged with 6.78 wt % of 2,4-tolylene diisocyanate, 0.08 wt % of di-n-butyltin dilaurate, and 0.02 wt % of 2,6-di-t-butyl-p-cresol. 93.11 wt % of "DPHA" manufactured by Nippon Kayaku Co., Ltd. (mixture of dipentaerythritol pentacrylate and dipentaerythritol hexacrylate) was added dropwise with stirring while maintaining the temperature at 60° C. or less. After the addition, the mixture was allowed to react at 50–70° C. for two hours. The reaction was terminated when the residual isocyanate was reduced to 0.1 wt % or less. The resulting urethane acrylate is referred to as "A-5".

Synthesis Example 6 of urethane (meth)acrylate

A reaction vessel equipped with a stirrer was charged with 10.03 wt % of 2,4-tolylene diisocyanate, 0.08 wt % of di-n-butyltin dilaurate, and 0.02 wt % of 2,6-di-t-butyl-p-cresol. 21.12 wt % of bisphenol A polypropoxy glycol (average degree of polymerization: n=10) was added dropwise with stirring while maintaining the temperature at 60° C. or less. After the addition, the mixture was allowed to react at 40–60° C. for one hour. After the addition of 68.85 wt % of "DPHA" manufactured by Nippon Kayaku Co., Ltd. (mixture of dipentaerythritol pentacrylate and dipentaerythritol hexacrylate), the mixture was allowed to react at 50–70° C. for two hours. The reaction was terminated when the residual isocyanate was reduced to 0.1 wt % or less. The resulting urethane acrylate is referred to as "A-6".

Example 1

A reaction vessel equipped with a stirrer was charged with 9.7 parts by weight of benzyl acrylate as the component (B), 31.1 parts by weight of A-2 as the component (A), 22.3 parts by weight of ethylene oxide (4 mol) modified phenoxyethyl acrylate, 24.3 parts by weight of tris(2-acryloyloxyethyl) isocyanurate, and 9.7 parts by weight of acryloylmorpholine as the component (C), and 2.9 parts by weight of 1-hydroxycyclohexyl phenyl ketone as the component (D). The mixture was stirred for one hour while maintaining the liquid temperature at 50–60° C. to obtain a homogenous curable liquid resin composition.

In Examples 2–5 and Comparative Examples 1–4, a curable liquid resin composition was obtained by charging a reaction vessel with components shown in Table 1. The amount of each component in Table 1 is indicated as parts by weight.

Evaluation Method

Test specimens were prepared from the curable liquid resin composition obtained in the example according to the method described below. The refractive index, releasability from a mold, and adhesion to a substrate before and after exposure to heat-moisture environment were measured as described below.

(1) Measurement of refractive index: The resin composition was applied to a glass plate to a thickness of 200 μm using an applicator bar. Ultraviolet radiation was applied to the composition at a dose of 1.0 μ/cm$^2$ in nitrogen to obtain a test specimen. The refractive index at 25° C. was measured using an Abbe refractometer manufactured by Atago Co., Ltd. according to JIS K7105.

(2) Releasability from mold: The resin composition was applied to a mold having a Fresnel lens shape (hereinafter abbreviated as "lens mold"). The resin composition was covered with a methylmethacrylate-styrene copolymer (MS) substrate (10×10 cm) with a thickness of 1.8 mm so that bubbles were not formed. The MS substrate was pressed so that the resin composition layer had a predetermined thickness (100 μm). The resin layer was then cured by applying ultraviolet radiation at a dose of 1.0 J/cm$^2$ from the side of the substrate. The cured resin (hereinafter referred to as "lens substrate") was removed from the mold by hand. A cured resin easily removed from the mold was evaluated as "Good", a cured resin removed with some force was evaluated as "Fair", and a cured resin which could not be removed or a part of the resin layer remained adhering to the mold was evaluated as "Bad". The evaluation was also performed using a polymethylmethacrylate (PMMA) substrate.

(3) Adhesion to substrate: The lens substrate removed from the lens mold was evaluated by removing the lens from the MS substrate at the interface using a cutter knife and by measuring adhesion to the MS substrate from the side of the surface removed from the lens mold using a cross-cut peeling test according to JIS K5400. A case where the resin was not removed using the cutter and the square was not removed from the MS substrate but remained adhering to the MS substrate was evaluated as "Excellent", a case where a part of the resin was removed using the cutter and the square was not removed from the MS substrate but remained adhering to the MS substrate was evaluated as "Good", a case where some of the squares were removed from the MS substrate was evaluated as "Fair", and a case where all the squares were removed from the MS substrate was evaluated as "Bad". The evaluation was also performed using a polymethylmethacrylate (PMMA) substrate.

(4) Adhesion to substrate after heat-moisture exposure: The lens substrate removed from the lens mold was allowed to stand under a heat-moisture environment (60° C.×95% RH) for 504 hours and subjected to the same evaluation as in (3). The evaluation was also performed using a polymethylmethacrylate (PMMA) substrate.

TABLE 1

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
| Component A | A-1 |  | 29.1 | 29.1 | 29.1 |  |  | 29.1 | 29.1 |  |
|  | A-2 | 31.1 |  |  |  | 1 | 31.1 |  |  | 1 |
|  | A-3 |  |  |  |  | 14.1 |  |  |  | 14.1 |
|  | A-4 |  | 1.9 | 1.9 | 9 |  |  | 1.9 | 9 |  |
|  | A-5 |  |  |  |  | 11.3 |  |  |  | 11.3 |
|  | A-6 |  |  |  | 9.7 |  |  |  | 9.7 |  |
| Component B | Benzyl acrylate | 9.7 | 9.7 | 19.4 | 19.4 | 1.4 |  |  |  |  |
| Component C | C-1 (M102) |  |  |  |  | 22.5 |  |  |  | 22.5 |
|  | C-2 (M110) |  |  |  |  | 33.8 |  |  |  | 33.8 |
|  | C-3 (ACMO) | 9.7 | 9.7 | 9.7 | 9.7 |  | 9.7 | 9.7 | 9.7 |  |
|  | C-4 (M315) | 24.3 | 24.3 | 24.3 | 14.6 |  | 24.3 | 24.3 | 14.6 |  |
|  | C-5 (MPHE) | 22.3 | 22.3 | 12.6 | 12.6 |  | 32.0 | 32.0 | 32.0 |  |
| Component D | D-1 | 2.9 | 2.9 | 2.9 | 2.9 | 2.8 | 2.9 | 2.9 | 2.9 | 2.8 |
| Properties of cured product |  |  |  |  |  |  |  |  |  |  |
| Refractive index |  | 1.550 | 1.551 | 1.551 | 1.551 | 1.550 | 1.550 | 1.550 | 1.550 | 1.550 |
| Releasability from mold |  | Good | Good | Good | Good | Good | Good | Good | Good | Good |
| Adhesion to MS substrate |  | Excellent | Excellent | Excellent | Excellent | Excellent | Good | Good | Good | Good |
| Adhesion to MS substrate after heat-moisture exposure |  | Good | Good | Excellent | Fair | Fair | Fair | Fair | Fair | Bad |
| Adhesion to PMMA substrate |  | Excellent | Excellent | Excellent | Excellent | Good | Good | Good | Good | Good |
| Adhesion to PMMA substrate after heat-moisture exposure |  | Good | Good | Excellent | Fair | Fair | Fair | Fair | Fair | Bad |

Component (C):
C-1: Phenoxy acrylate modified with four mol of ethylene oxide ("Aronix M102" manufactured by Toagosei Co., Ltd.)
C-2: Acrylate of p-cumylphenol modified with one mol of ethylene oxide ("Aronix M110" manufactured by Toagosei Co., Ltd.)
C-3: Acryloylmorpholine ("ACMO" manufactured by KOHJIN Co., Ltd.)
C-4: Tris(2-acryloyloxyethyl)isocyanurate ("Aronix M315" manufactured by Toagosei Co., Ltd.)
C-5: Phenoxyethyl acrylate ("New Frontier PHE" manufactured by Daiichi Kogyo Seiyaku Co., Ltd.)
Component (D):
D-1: 1-Hydroxycyclohexyl phenyl ketone ("Irgacure 184" manufactured by Ciba Specialty Chemicals Co., Ltd.)

EFFECT OF THE INVENTION

The radiation-curable resin composition of the present invention provides a cured product exhibiting a high refractive index and excellent heat-moisture adhesion to a plastic substrate, and is suitable for manufacturing optical parts, in particular, optical lenses used for a transparent screen such as a Fresnel lens and a lenticular lens.

What is claimed is:
1. A radiation-curable resin composition for forming an optical part, comprising: (A) 5–70 wt % of urethane (meth)acrylate, (B) 0.1 wt % of benzyl (meth)acrylate, and (C) 10–70 wt % of an ethylenically unsaturated group-containing compound other than the components (A) and (B), wherein:
   i) the number average molecular weight of said urethane (meth)acrylate (A) is 1000–15,000; and
   ii) (C) is selected from the group consisting of N-vinylpyrrolidone, N-vinylcaprolactam, vinylimidazole, and vinylpyridine, phenoxyethyl (meth)acrylate, phenoxy-2-methylethyl (meth)acrylate, phenoxyethoxyethyl (meth)acrylate, 2-phenylphenoxyethyl (meth) acrylate, 4-phenylphenoxyethyl (meth)acrylate, (meth)acrylate of p-cumylphenol reacted with ethylene oxide, 2-bromophenoxyethyl (meth)acrylate, 2,4-dibromophenoxyethyl (meth)acrylate, 2,4, 6-tribromophenoxyethyl (meth)acrylate, phenoxy (meth)acrylate modified with two mol or more of ethylene oxide or propylene oxide, isobornyl (meth)acrylate, bornyl (meth)acrylate, tricyclodecanyl (meth)acrylate, dicyclopentanyl (meth)acrylate, dicyclopentenyl (meth) acrylate, cyclohexyl (meth)acrylate, 4-butylcyclohexyl (meth)acrylate, acryloylmorpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth) acrylate, isooctyl (meth)acrylate, 2-ethylhexyl (meth) acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, iso-stearyl (meth)acrylate, tetrahydrofurfuryl (meth)acrylate, butoxyethyl (meth)acrylate, ethoxydiethylene glycol (meth)acrylate, polyethylene glycol mono(meth)acrylate, polypropylene glycol mono(meth)acrylate, methoxyethylene glycol (meth) acrylate, ethoxyethyl (meth)acrylate, methoxypolyethylene glycol (meth)acrylate, methoxypolypropylene glycol (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth) acrylate, 7-amino-3, 7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethyihexyl vinyl ether, trimethylolpropane tri(meth)acrylate, pentaerythritol tri(meth)acrylate, ethylene glycol di(meth)acry- late, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris (2-hydroxyethyl)isocyanurate tri(meth)acrylate, tris(acryloyloxy)isocyanurate, bis(hydroxymethyl)tricyclodecane di(meth)acrylate, dipentaerythritol hexa(meth)acrylate, di(meth)acrylate of polyethylene oxide or propylene oxide addition diol of bisphenol A, di(meth)acrylate of ethylene oxide or propylene oxide addition diol of hydrogenated bisphenol A, epoxy(meth)acrylate obtained by addition of (meth)acrylate to diglycidyl ether of bisphenol A, triethylene glycol divinyl ether and compounds shown by the following formulas (2) and (3;

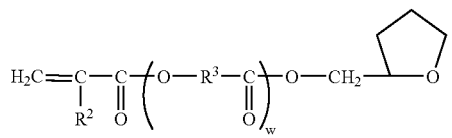

(2)

wherein $R^2$ represents a hydrogen atom or a methyl group, $R^3$ represents an alkylene group having 2–8 carbon atoms, and w represents a number of 1–8; and

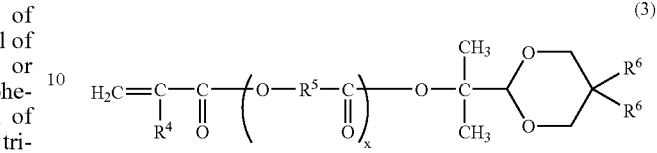

(3)

wherein $R^4$ and $R^6$ individually represent a hydrogen atom or a methyl group, $R^5$ represents an alkylene group having 2–8 carbon atoms, and x represents a number of 1–8.

\* \* \* \* \*